C. H. PRESBREY.
School-Desks.
No. 135,154.　　　　　　　　　Patented Jan. 21, 1873.
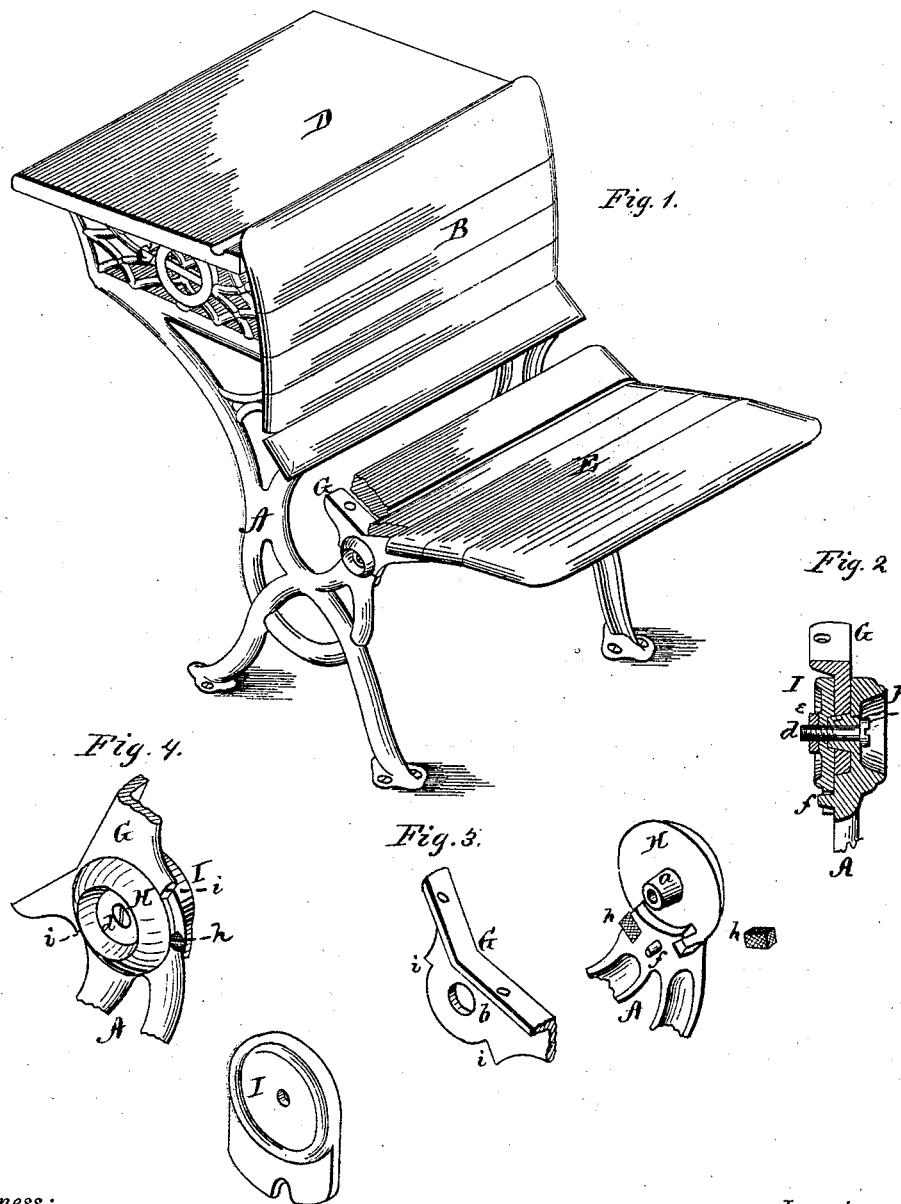

UNITED STATES PATENT OFFICE.

CHARLES H. PRESBREY, OF STERLING, ILLINOIS, ASSIGNOR TO NOVELTY IRON WORKS MANUFACTURING COMPANY, OF SAME PLACE.

IMPROVEMENT IN SCHOOL-DESKS.

Specification forming part of Letters Patent No. 135,154, dated January 21, 1873.

*To all whom it may concern:*

Be it known that I, CHARLES H. PRESBREY, of Sterling, in the county of Whitesides and in the State of Illinois, have invented certain new and useful Improvements in School-Desk; and do hereby declare that the following is a full, clear, and exact description thereof, reference being had to the accompanying drawing and to the letters of reference marked thereon making a part of this specification.

The nature of my invention consists in the construction and arrangement of the hinge upon which the seat in a school-desk turns, as will be hereinafter more fully set forth.

In order to enable others skilled in the art to which my invention appertains to make and use the same, I will now proceed to describe its construction and operation, referring to the annexed drawing, in which—

Figure 1 is a perspective view of an entire school-desk; and Figs. 2, 3, and 4 are detached views of the hinge.

A A represent the frame of a school-desk, to which the back B, book-case C, and desk-top D are attached. E is the seat, composed of a series of slats attached to arms G G, which are hinged to the side pieces A A of the frame.

These parts may all be constructed in any of the known and usual ways, as I lay no claim to the same, merely to the hinge connecting the seat-arms G G with the side pieces A A.

Upon the front of the side piece A, at a suitable height from the floor, is a circular projection, H, on the inner side of which, in the center, is a conical projection, $a$. Upon this a projection, $b$, on the under side of the arm G, is placed and turns, said conical projection $a$ thus forming the bearing and the pivot for the seat. The smaller end of the conical projection fits in a recess on a washer, I, placed on the inner side of the frame or side piece A, and the whole secured by a bolt, $d$, and nut $e$. The bolt $d$ passes through a circular recess made on the outer side of the circular projection H, and through the cone $a$ and washer I, as shown in Fig. 2, and the nut $e$ is screwed on the inner end of the bolt. The washer I is made stationary by means of a slot in its lower end fitting over a lug or pin, $f$, on the side of the frame A. This joint thus formed may be compressed to any suitable degree to hold the seat from falling, and the washer, being stationary, prevents the bolt or nut from turning, or the joint from becoming loose. In the casting or frame A, on each side of the circular projection H, is a cavity or recess to admit a rubber bearing, $h$, and on the projection $b$, on the under side of the arm G, are shoulders $i\ i$ to come against said rubber bearings when the seat is raised or let down, making the seat noiseless. The cavities for the rubber bearings $h$ are so arranged in the casting that the bearings will be away from the turning parts of the arms, thus preventing any friction or wearing against the rubber to grind it out, and the shoulders $i\ i$ falling square on the surface of the rubber just as the movement of the seat is completed in either direction.

Having thus fully described my invention, what I claim as new, and desire to secure by Letters Patent, is—

The combination of the frame A with lug $f$, the circular recessed projection H with conical trunnion $a$, the arm G placed on said trunnion, the slotted washer I placed over the lug $f$, and fitting on the end of the trunnion $a$, and the bolt and nut $d\ e$ for confining the whole together, all substantially as and for the purposes herein set forth.

In testimony that I claim the foregoing I have hereunto set my hand this 23d day of November, 1872.

CHARLES H. PRESBREY.

Witnesses:
WM. L. PATTERSON,
F. T. JUNE.